(12) United States Patent
Koeman et al.

(10) Patent No.: US 6,285,653 B1
(45) Date of Patent: Sep. 4, 2001

(54) METHOD AND APPARATUS TO MEASURE FAR END CROSSTALK FOR THE DETERMINATION OF EQUAL LEVEL FAR END CROSSTALK

(75) Inventors: Henriecus Koeman, Edmonds; Jeffrey S. Bottman, Seattle, both of WA (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 09/152,153

(22) Filed: Sep. 11, 1998

(51) Int. Cl.⁷ ........................................................ H04J 1/00
(52) U.S. Cl. .......................... 370/201; 379/416; 379/417; 375/346; 455/67.3
(58) Field of Search ............................. 370/201; 379/416, 379/417; 375/346; 455/67.3

(56) References Cited

U.S. PATENT DOCUMENTS 5,532,603 * 7/1996 Bottman ................................. 324/628
5,698,985 * 12/1997 Bottman ................................. 324/628
5,731,706 * 3/1998 Koeman et al. ....................... 324/628

FOREIGN PATENT DOCUMENTS

0675607 A2 * 10/1995 (EP) .

OTHER PUBLICATIONS

Young–Heung Kang, "A study on the performance of digital subscriber line in gaussiar far–end cross talk noises environments." IEEE, vol. 1, pp. 34–37.*

* cited by examiner

Primary Examiner—Hassan Kizou
Assistant Examiner—Thien Tran
(74) Attorney, Agent, or Firm—Dellet and Walters

(57) ABSTRACT

A system for determining FEXT and ELFEXT of generic cabling systems provides accurate measurements of these parameters by determining and removing the effect of the connectors at the respective ends of the link, thereby giving measurement values that correspond to the defined link, rather than including the crosstalk contributions of the connectors, which can be substantial.

23 Claims, 6 Drawing Sheets

METHOD AND APPARATUS TO MEASURE FAR END CROSSTALK FOR THE DETERMINATION OF EQUAL LEVEL FAR END CROSSTALK

BACKGROUND OF THE INVENTION

This invention relates to the measurement of Far End Crosstalk (FEXT) and determination of Equal Level Crosstalk (ELFEXT).

In twisted pair cabling as typically used for Local Area Network (LAN) systems, Attenuation, Near End Crosstalk, Return Loss and Equal Level Crosstalk (ELFEXT) transmission performance parameters are extremely important. For 1000BASE-T (1 Gbps Ethernet), which is currently under development by the IEEE 802.3ab committee, ELFEXT performance of a link is extremely important for satisfactory operation.

Referring to FIG. 1, a diagrammatic representation of a typical 1 Gbps Ethernet Link between a workstation and LAN equipment, the 1 Gbps Ethernet link between a workstation 10 and LAN equipment 12 uses 4 wire-pairs 14, 16, 18 and 20, with bi-directional transmission on each wire pair (transmit and receive). One of the signal transmission modes of 1 Gbps Ethernet on twisted pair cabling involves signals applied to one end of the link at the same time and traveling in parallel to the other end of the link. One major source of noise in this transmission mode results from coupling of one wire pair to another wire pair, as illustrated in FIG. 1. The impact of crosstalk on the wire pair 14 is shown at the top of FIG. 1 for a transmission from workstation 10 to LAN equipment 12. Crosstalk from the three other pairs 16, 18 and 20, couples into the top wire pair 14 as shown. At the receive input at the LAN equipment, this signal disturbs the desired signal, which is the attenuated signal from the workstation end. The signal-to-noise ratio from this contribution is therefore the (linear) ratio of crosstalk amplitude and amplitude of the attenuated signal. The crosstalk signal in this case is called "Far End Crosstalk" (FEXT). If both the FEXT and attenuation are expressed in dB, the signal-to-noise ratio expressed in dB is obtained by calculating the difference between the FEXT and attenuation. This ratio is called Equal Level Far End Crosstalk ("ELFEXT").

All wire pairs are noise sources for FEXT, and therefore add up. Since the signals on the wire pairs are generally uncorrelated, most often the combined effects of crosstalk from all wire pairs is summarized by taking the square root of the sum of the power of all crosstalk components (Power Sum FEXT, or Power Sum ELFEXT) to obtain an estimate for the total noise and signal-to-noise ratio at a receive input.

Other sources of noise in the 1 Gbps LAN system include Near End Crosstalk (NEXT) and Return Loss. NEXT performance is critical since signals arriving from the remote end of the link are disturbed by the output signals applied to the near end of the link. The bi-directional nature of signal on each wire pair results in reflected signals finding their way in the local receiver. Therefore, means are also designed in the 1 Gbps Ethernet system to compensate for this effect ("echo cancellation"). The 1 Gbps Ethernet system includes means for "learning" crosstalk performance and providing compensation for some of the disturbing effects. NEXT, ELFEXT and return loss are important link parameters and therefore must be measured accurately.

Referring now to FIG. 2, a graphical representation of a typical link, a local equipment jack 22 receives a patch cord plug 24 therein. The local equipment may comprise a workstation, for example, or in the case of a testing situation, may be a test instrument for measuring and testing network performance. Patch cord plug 24 defines one end of patch cord 26, the other end thereof suitably comprising another patch cord plug 28. Plug 28 connects to link jack 30, which may comprise a wall jack in a typical installation. Link jack 30 defines the connection to link cable 32 which extends to jack 34 of the link. There may be several connectors in link cable segment 32. At the last jack, a remote patch cord 36 includes plugs 38 and 40 and connects between jack 34 and the jack 42 at the remote equipment. The formal definition of the link excludes the connection to the equipment at the local and remote ends, and therefore is defined as being between point 44, which is just to the patch cord side of local patch cord plug 24, and point 46, which is just to the patch cord side of remote plug 40. The performance of a LAN system is measured at the link side of a mating connector, and therefore the performance measurement of the link should not include the impact from that connection. In Telecommunications Industry Association standard TSB-67, the standard cabling test configurations ("basic link" and "channel" ) specifically exclude this connection from the definition of the link. The international ISO/IEC 11801 cabling standard defines the channel configuration in the same manner. Moreover, when the transmission performance of a channel configuration is to be measured, the user patch cord (e.g., cord 26 or cord 36) is employed during the measurements. Since the standard plug on a user patch cord for a generic cabling system as defined in TIA/EIA-568-A or ISO/IEC 11801 and 1 Gbps Ethernet system is a modular 8-pin RJ-45 connector, the mating jack on the instrument has to be a modular 8-pin RJ-45 type. Unfortunately, the crosstalk performance of a modular 8-pin connector is relatively poor and has a material influence on the measured performance of a link with those connectors included in the result. The FEXT resulting from the connection to the measurement instrument system at the local and remote end must be compensated for in order to report accurate measurement values. The computed ELFEXT is subject to the same compensation.

For testing a basic link configuration, per TIA/EIA-568-A or the permanent link configuration per ISO/IEC 11801, a network technician may use a special patch cord, with the type of connector employed being one having low crosstalk characteristics. In such a case with a special patch cord, the transmission performance of the link using the special test cords is measured. However, by using such a special patch cord, the test configuration is not the actual configuration which ultimately carries the data during times other than in the test condition, since the user patch cord is removed during the test. Therefore, the measurements may not accurately represent the characteristics of the system once the special patch cord has been removed. Consequently, a method to accurately measure the channel configuration in addition to the basic link and permanent link test configuration is very desirable.

SUMMARY OF THE INVENTION

In accordance with the invention, the effects of crosstalk resulting from the connections local to and at the far end from a test instrument are subtracted from measurement results, providing FEXT and computed ELFEXT results that accurately describe those transmission parameters for the link.

Accordingly, it is an object of the present invention to provide an improved method to subtract out the impact from crosstalk which occurs at local and far end connections to a test instruments from FEXT and ELFEXT results that are reported for the defined link configuration.

It is a further object of the present invention to provide an improved test instrument that measures and reports FEXT and ELFEXT, compensating for the contribution of crosstalk at connections to the test instrument.

It is yet another object of the present invention to provide an improved system for FEXT measurement that accommodates network connectors having substantial crosstalk properties.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises a network test instrument having microprocessor controlled operations, for example. The system is configured to take various measurements and use those measurements to accurately determine all transmission parameters and in particular far end crosstalk.

In implementing the invention, there are two main assumptions that are used. First, the crosstalk, which results from capacitive and inductive imbalance, causes a crosstalk current in the disturbed wire pair with a fixed (90° or 270°) phase angle at the location where the crosstalk occurs. This is clear from circuit models of crosstalk in twisted pair wiring (Transmission Systems for Communication, Fourth Edition, February 1970, Members of Technical Staff Bell Laboratories: Chapter 11, Crosstalk, Section 11.3 Coupling Crosstalk). The distance to the point of measurement causes phase angle changes, which are proportional to the frequency of the test signal. Second, the FEXT coupling is mainly determined by the properties of the jack and is relatively independent of the properties of the plug that mates with it. Test methods for jacks defined in the TIA/EIA-568A and ISO/IEC 11801 standards define the properties of plugs to be used to verify NEXT performance. A test using plugs with properties over a wider range than specified for NEXT performance results in relatively constant FEXT measurements between cable pairs. The 3,6 and 4,5 pair combinations are generally considered worst case. It was found that the variation of mated FEXT was only 2 dB for this pair combination.

Assuming that the mated FEXT of a connector is relatively independent of the plug that mates with a jack, it is therefore possible to determine the mated FEXT using a test plug. This value is then used to determine the impact on the overall FEXT that is measured. The assumption applies to both the effects from the connection used at the local end of the link and the connection used at the remote end of the link.

Figure 3:
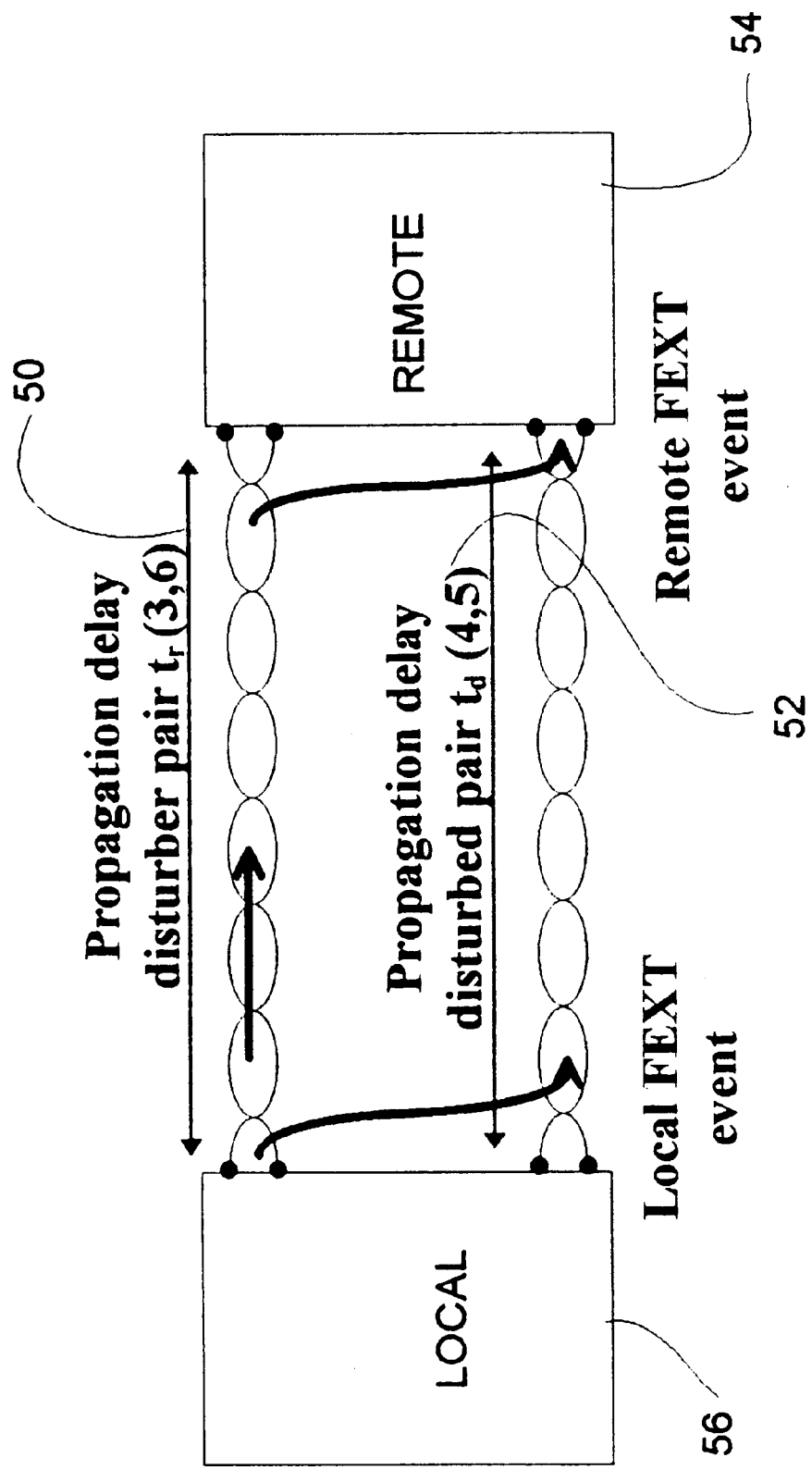
FIG. 3 is a diagram of a link showing impact from FEXT in local and remote connections for a disturbing pair and a disturbed pair.

Referring now to FIG. 3, a diagram showing impact from FEXT in local and remote connections for a disturbing pair and a disturbed pair of a link, a basic analysis of the impact from the local and remote connection on overall FEXT that is measured will be provided. Consider the FEXT/ELFEXT from pair 3,6 (disturber pair 50) to pair 4,5 (disturbed pair 52). At the remote end 54 of the link on the disturbed pair 52 (4,5 pair), the FEXT is measured ($FEXT_{3,6-4,5}$) as is the attenuation of the 4,5 pair ($att_{4,5}$). The ELFEXT for the 3,6-4,5 pair combination is then given by equation 1.

$$ELFEXT_{3,6-4,5} = \frac{FEXT_{3,6-4,5}}{att_{4,5}} \quad (1)$$

The FEXT as measured on the 4,5 pair at the remote end contains two additional, undesirable contributions, the FEXT from the local connector, $FEXT_{loc}$, which is attenuated in the disturbed pair 4,5 in the amount of $att_{4,5}$, and the FEXT from the remote connector, $FEXT_{rem}$, which is attenuated in the disturber pair 3,6 before it arrives at the remote connector in the amount of $att_{3,6}$. The total FEXT measured on the 4,5 pair at the remote end is given by equation 2.

$$FEXT_{3,6-4,5,total} = FEXT_{3,6-4,5,link} + att_{4,5}*FEXT_{loc} + att_{3,6}*FEXT_{rem} \quad (2)$$

The far end crosstalk of the link is therefore:

$$FEXT_{3,6-4,5,link} = FEXT_{3,6-4,5,total} - att_{4,5}*FEXT_{loc} - att_{3,6}*FEXT_{rem} \quad (2a)$$

When the value of the total FEXT in equation 2 is divided by the attenuation $att_{4,5}$ of the 4,5 wire pair, the result is equation 3:

$$ELFEXT_{3,6-4,5,total} = ELFEXT_{3,6-4,5,link} + FEXT_{loc} + \frac{att_{3,6}}{att_{4,5}} * FEXT_{rem} \quad (3)$$

Therefore the ELFEXT of the link can be found by subtracting the FEXT of the local and remote connections from the totally measured ELFEXT contributions:

$$ELFEXT_{3,6-4,5,link} = ELFEXT_{3,6-4,5,total} - FEXT_{loc} - \frac{att_{3,6}}{att_{4,5}} * FEXT_{rem} \quad (4)$$

Each of these quantities is a vector type quantity, having relevant amplitude and phase information. The method of determining the ELFEXT of a link configuration as defined in TIA TSB-67 from the totally measured ELFEXT and previously measured connector FEXT can be implemented by measuring both amplitude and phase or real and imaginary parts of all quantities in equation (4).

Equation (2a) can be re-written in terms of amplitude and phase to clarify the method of implementation as in equation (5).

$$FEXT_{3,6-4,5,link}|e^{j\phi FEXT,3,6-4,5,link}=FEXT_{3,6-4,5,total}|e^{j\phi FEXT,3,6-4,5,total}|att_{4,5}|e^{j\phi att,4,5*}|FEXT_{loc}|-|att_{3,6}|e^{j\phi att,3,6*}|FEXT_{rem}| \quad (5)$$

where $j$ is the complex operator.

$\varphi$ is the phase related to the quantity identified by the subscript $|xxx|$ is the magnitude of the quantity identified between the vertical bars.

In this equation, it is assumed that the phase response of the connector to a stimulus signal is a reference 0 degrees. The phase relationship of the FEXT relative to the stimulus signal caused by the local and remote connectors as measured at the remote end is determined by the electrical lengths of the 3,6 and 4,5 wire pairs. At high frequencies, the propagation delay of twisted pair wiring is essentially independent of frequency, and therefore the phase delay can be easily obtained from a propagation delay measurement:

$$\phi = t_{prop} * 360 * \text{frequency degrees.} \tag{6}$$

The phase of the totally measured FEXT signal at the remote end, relative to the stimulus signal, is unknown because the coupling may occur throughout the length of the link and therefore the total electrical distance traveled may depend on where the coupling occurs. In many practical situations some assumptions may be used, which considerably simplify the computations.

The phase of the totally measured FEXT signal, including the impact from FEXT of the local and remote connectors is most easily measured relative to the phase of the attenuated signal (on the disturber pair: 3,6 pair in this example) as received at the remote end of the link. Equation (5) can be re-written as:

$$|FEXT_{3,6-4,5,link}|e^{j(\phi FEXT,3,6-4,5,link-\phi att,3,6)} = |FEXT_{3,6-4,5,total}|e^{j(\phi FEXT,3,6-4,5,total-\phi att,3,6)} - |att_{4,5}|e^{j(\phi att,4,5-\phi att,3,6)*}|FEXT_{loc}|-|att_{3,6}|*|FEXT_{rem}| \tag{7}$$

Since the test limit for the absolute value of ELFEXT is specified, equation (7) becomes:

$$|ELFEXT_{3,6-4,5,link}| = \tag{8}$$

$$\left| \frac{|FEXT_{3,6-4,5,total}|}{|att_{4,5}|} e^{j(\varphi FEXT,3,6-4,5,total - \varphi att,3,6)} - |FEXT_{loc}| * e^{j(\varphi att,4,5 - \varphi att,3,6)} - |FEXT_{rem}| * \frac{|att_{3,6}|}{|att_{4,5}|} \right|$$

Real world cables have different twist rates for multi-pair twisted pair cabling in order to average out crosstalk and therefore to reduce the observed crosstalk. This is the reason that the attenuation of different wire pairs can be different. However, most often, differences are small, and attenuation of different wire pairs may often be considered equal.

If the attenuation of the 3,6 and 4,5 wire pairs are approximately equal, equation (8) simplifies to:

$$|ELFEXT_{3,6-4,5,link}| = \left| \frac{|FEXT_{3,6-4,5,total}|}{|att_{4,5}|} e^{j(\varphi FEXT,3,6-4,5,total - \varphi att,3,6)} - |FEXT_{loc}| * e^{j(\varphi att,4,5 - \varphi att,3,6)} - |FEXT_{rem}| \right| \tag{9}$$

The main impact from twist rate differences is that the propagation delay in wire pairs differs. Accordingly, substantial differences in phase delay may occur. The allowed delay skew (difference in propagation delay) is 50 ns per TIA/EIA-568-A-1. This allowed delay corresponds to a possible phase angle shift of 5*360°=1800° at 100 MHz. Since the crosstalk signals add in a vectoral manner, it is crucial to address the phase shift that may occur.

However, if the wavelength of the frequency is long, propagation delay differences are practically small. This tends to be almost always true for test frequencies below 10 MHz. If the link is relatively short or the delay skew is well below the maximum allowed, all FEXT contributions, both originating in the link to be measured and the local and remote connectors, will be in-phase, often at frequencies up to 50 MHz, and equation (8) is reduced to:

$$|ELFEXT_{3,6-4,5,link}| = \tag{10}$$

$$\frac{|FEXT_{3,6-4,5,total}|}{|att_{4,5}|} - |FEXT_{loc}| - |FEXT_{rem}| * \frac{|att_{3,6}|}{|att_{4,5}|}$$

Compliant links per TIA/EIA-568-A and ISO/IEC 11801 have a maximum length of 100 m. The highest frequency for category 5 cabling is 100 Mhz. For higher performance cabling standards, significantly higher highest frequencies are being considered. The simplification used to compute the ELFEXT loss of the defined link is determined by the additional measurement error that may result from the simplification. Practically, it is a fraction of the total measurement error. Typically, allowable error will be any order of a fraction of decibel, and any decision to use this simplification is suitably based on keeping any error amount in the fractional decibel range.

When the attenuation and propagation delay in both disturber and disturbed pair is the same, the attenuation of any crosstalk event anywhere in the link shows up attenuated with a constant amount and the very same phase delay. Therefore, it now becomes totally irrelevant where the crosstalk occurs along the length of the link; it will always have the same impact. In this case, equation (10) simplifies further to:

$$|ELFEXT_{3,6-4,5,link}| = \frac{|FEXT_{3,6-4,5,total}|}{|att_{4,5}|} - |FEXT_{loc}| - |FEXT_{rem}| \tag{11}$$

Note that all quantities in equation (11) are magnitude only quantities.

The same principles of compensation that are described herein as frequency responses can be implemented using impulse responses as they are correlated through Fourier transforms.

Figure 4:
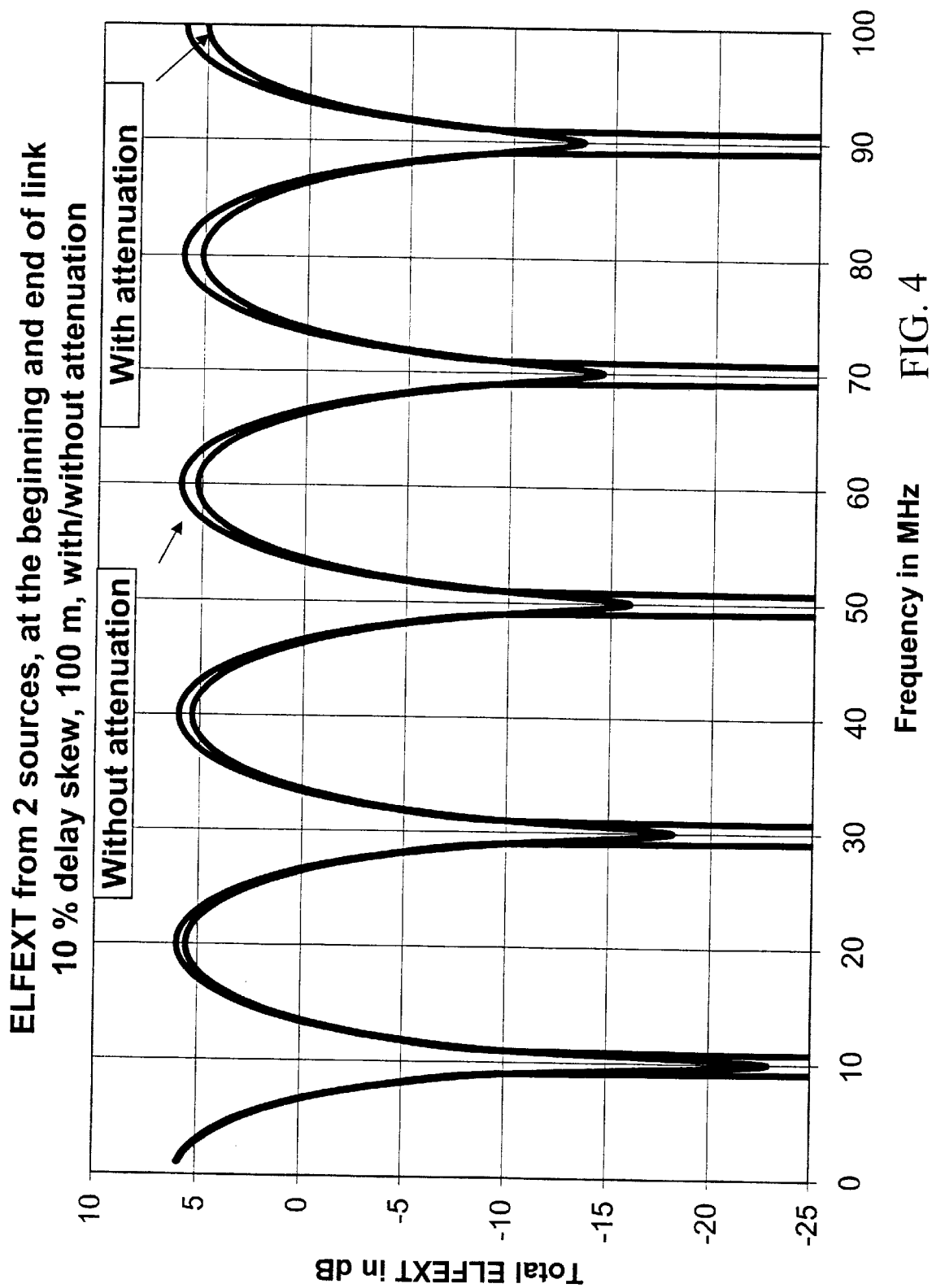
FIG. 4 is a graph showing calculated total FEXT from equal local and remote connector FEXT contributions.

When considering a link with no crosstalk in the cable and equal amounts of crosstalk in the local and remote connections, the frequency response of the assembly will show nulls as shown in FIG. 4, a graph showing calculated total FEXT from equal local and remote connector FEXT contributions. If there were no difference in propagation delay in disturber and disturbed pair, these nulls would not exist. The remote connector term in equation (4) contains a factor equal to the ratio of attenuation in both wire pairs. When assuming that the ratio is exactly equal to 1, only a minor change occurs in the predicted FEXT/ELFEXT.

By observing conditions in link configuration and test frequency, these simplifications may be applied to obtain the best possible accuracy of ELFEXT results with a minimum measurement time. Such simplifications are suitably selected in accordance with a software control program operating a test instrument embodying the invention. The above noted conditions regarding link size, frequency/wavelength, crosstalk, etc. are employed to select which particular simplification (if any) is employed to determine the far end crosstalk.

Figure 5:
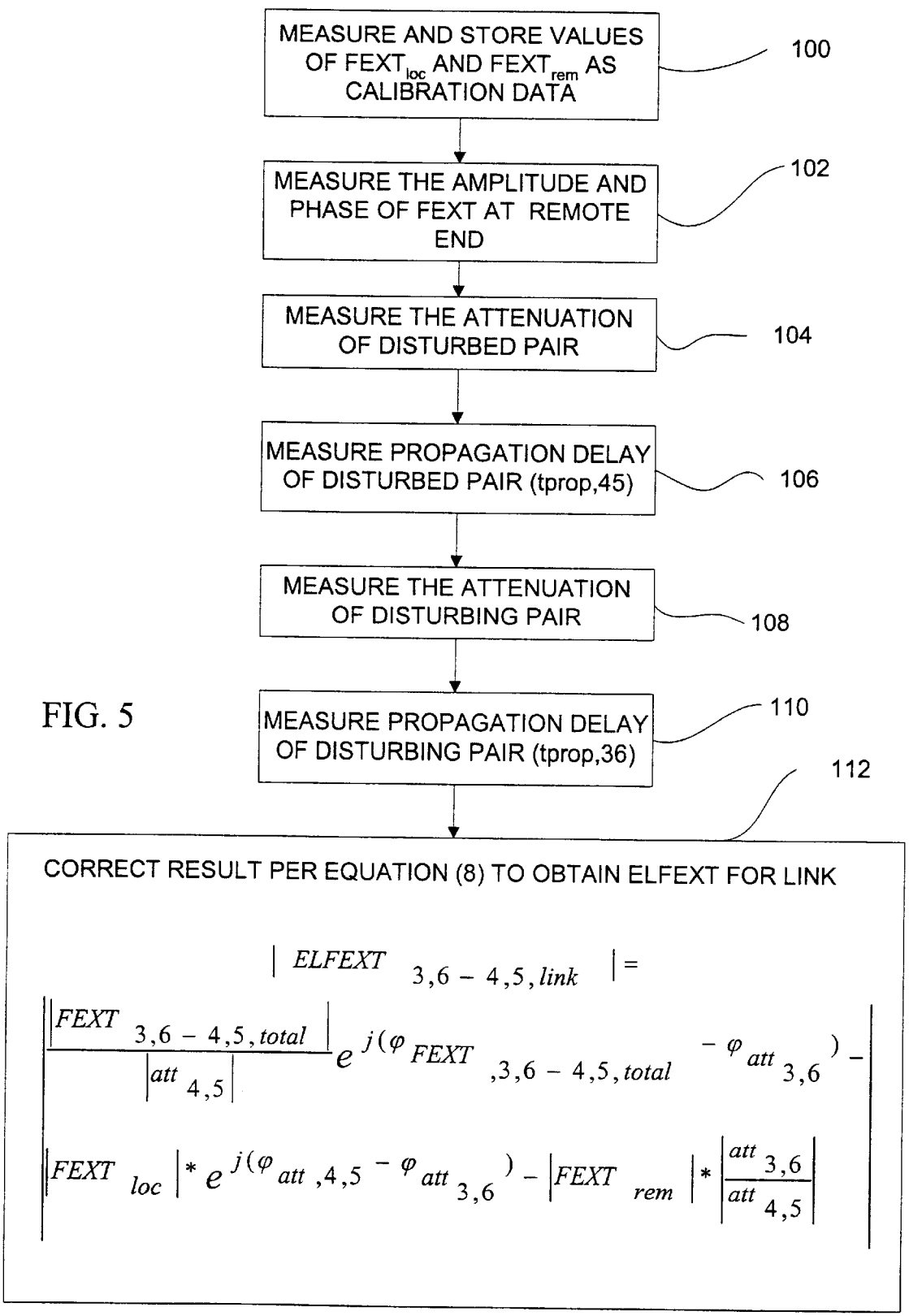
FIG. 5 is a flowchart of the measurement process according to the present invention.

Referring now to FIG. 5, a flow chart of the measurement procedure, first, the process is to measure and store as calibration data the values of $FEXT_{loc}$ and $FEXT_{rem}$ (step 100). Then, in step 102, the amplitude and phase of the FEXT is taken, measured at the remote end. Practically, the phase of the total FEXT is measured relative to the phase of the attenuated signal at the remote end of the disturbing wire pair. In the next step, step 104, the attenuation of the disturbed pair is measured $att_{4,5}$, followed by measuring the propagation delay of the disturbed pair $t_{prop,45}$ (step 106). The attenuation of the disturbing pair is measured next (step 108). Finally, the propagation delay of the disturbing pair is measured $t_{prop,36}$ (step 110), whereupon the measured values are employed in equation (8). As noted hereinabove, depending on the conditions, simplified equations may be used, equation 9, 10 or 11 (step 112) to obtain the ELFEXT for the defined link. It will be noted that in the illustrated example, pair 3,6 is considered to be the disturber pair, and pair 4,5 is the disturbed pair. The actual pairs employed in a given measurement will depend on the configuration being measured. Reference herein to pair 3,6 and 4,5 may therefore be substituted to mean reference to any disturber and disturbed pair, respectively. In test and measurement of an actual link, all pair combinations would be tested and measurements made for each pair in relation to all other pairs, to provide an overall view of the ELFEXT characteristics of the link.

Figure 1:
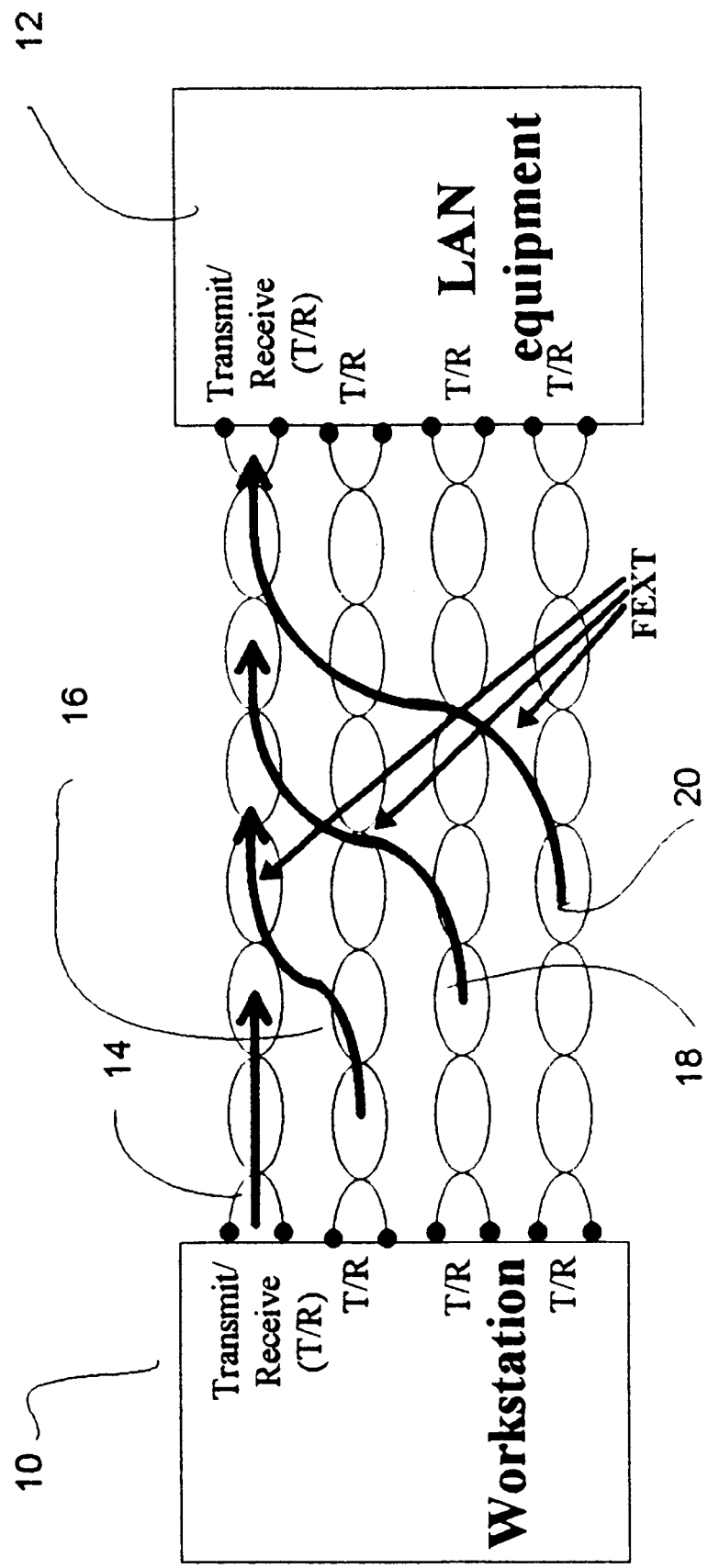
FIG. 1 is a diagrammatic representation of the parallel signal transmission of a typical 1 Gbps Ethernet Link between a workstation and LAN equipment.
Figure 2:
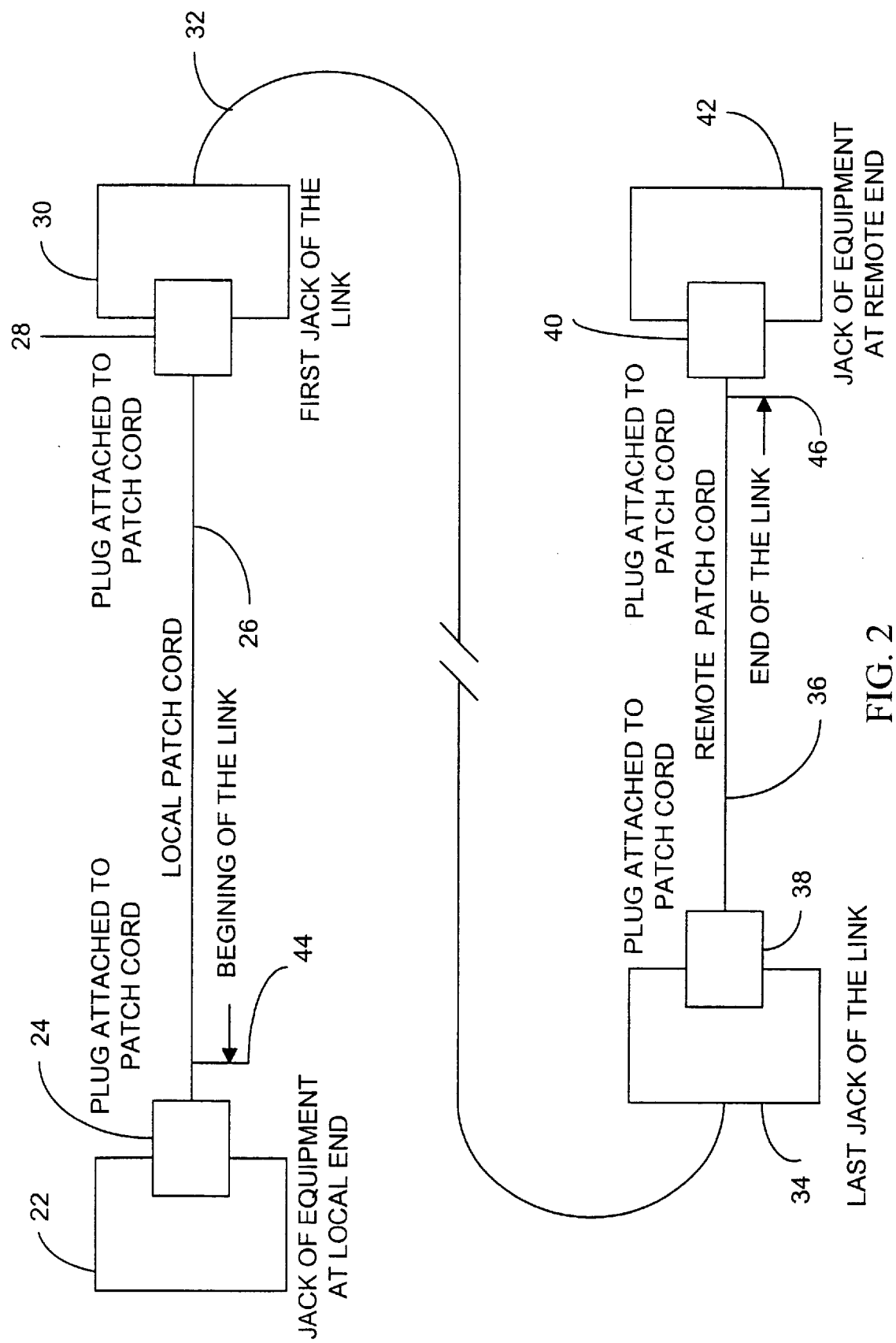
FIG. 2 is a graphical representation of a formal definition of a link.
Figure 6:
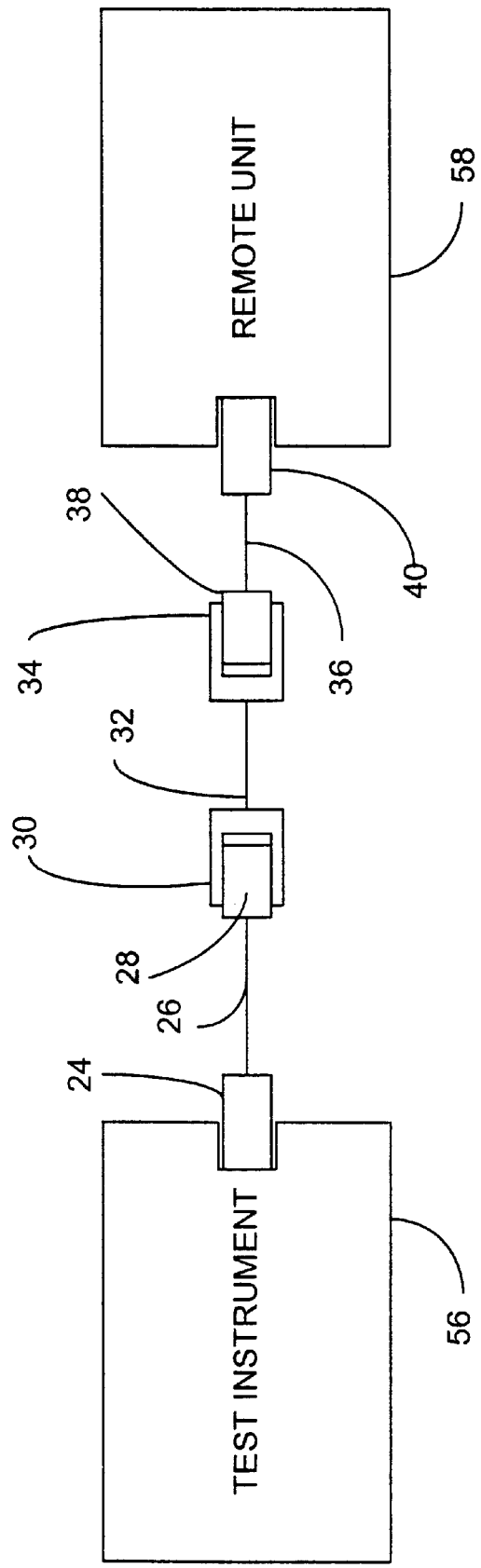
FIG. 6 is a diagram of an exemplary test instrument setup connected to a link, performing the method of measurement of the invention.

Referring to FIG. 6, a diagram of an exemplary test instrument setup connected to a link, performing the method of measurement of the invention, a test instrument 56 receives patch cord plug 24 (see FIG. 2) therein (a jack corresponding to jack 22 of FIG. 2 is provided in instrument 56). Local patch cord 26 connects the instrument to the link, via plug 28 and jack 30. Link cable 32 which will typically have plural other jacks connected thereto, extends to the last jack 34 of the link. At the last jack, a remote patch cord 36 includes plugs 38 and 40 and connects between jack 34 and the jack 42 at the remote unit 58. Either of the remote unit or the test instrument provides stimulus at one end of the link and the other records the measurements at the other end. The particular stimulus and measurement used to measure crosstalk are know to those of skill in the art, and are not detailed herein.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method of measuring far end crosstalk characteristics of a link comprising the steps of:
   measuring far end crosstalk of a local connector on the link;
   measuring far end crosstalk of a remote connector on the link;
   measuring phase and amplitude of far end crosstalk at a remote end of the link;
   measuring attenuation in a disturbed path;
   measuring propagation delay of the disturbed path;
   measuring attenuation in a disturbing signal path;
   measuring propagation delay of a disturbing signal path; and
   determining the equal level far end crosstalk based on the measured values.

2. The method of measuring far end crosstalk according to claim 1 wherein said determining step comprises comprising the steps of calculating the equal level far end crosstalk in accordance with the following formula:

$$|ELFEXT_{a,b-c,d,link}| = \left| \frac{|FEXT_{a,b-c,d,total}|}{|att_{c,d}|} e^{j(\varphi_{FEXT,a,b-c,d,total}-\varphi_{att,a,b})} - \right. \\ \left. |FEXT_{loc}| * e^{j(\varphi_{att,c,d}-\varphi_{att,a,b})} - |FEXT_{rem}| * \frac{|att_{a,b}|}{|att_{c,d}|} \right|,$$

where a,b indicates a disturber signal path and c,d indicates a disturbed signal path.

3. The method of measuring far end crosstalk according to claim 1 wherein said determining step comprises comprising the steps of calculating the equal level far end crosstalk in accordance with the following formula:

$$|ELFEXT_{a,b-c,d,link}| = \left| \frac{|FEXT_{a,b-c,d,total}|}{|att_{c,d}|} e^{j(\varphi_{FEXT,a,b-c,d,total}-\varphi_{att,a,b})} - \right. \\ \left. |FEXT_{loc}| * e^{j(\varphi_{att,c,d}-\varphi_{att,a,b})} - |FEXT_{rem}| \right|,$$

where a,b indicates a disturber signal path and c,d indicates a disturbed signal path.

4. The method of measuring far end crosstalk according to claim 1 wherein said determining step comprises comprising the steps of calculating the equal level far end crosstalk in accordance with the following formula:

$$|ELFEXT_{a,b-c,d,link}| = \frac{|FEXT_{a,b-c,d,total}|}{|att_{c,d}|} - |FEXT_{loc}| - |FEXT_{rem}| * \frac{|att_{a,b}|}{|att_{c,d}|},$$

where a,b indicates a disturber signal path and c,d indicates a disturbed signal path.

5. The method of measuring far end crosstalk according to claim 1 wherein said determining step comprises comprising the steps of calculating the equal level far end crosstalk in accordance with the following formula:

$$|ELFEXT_{a,b-c,d,link}| = \frac{|FEXT_{a,b-c,d,total}|}{|att_{c,d}|} - |FEXT_{loc}| - |FEXT_{rem}|,$$

where a,b indicates a disturber signal path and c,d indicates a disturbed signal path.

6. The method according to claim 1 wherein said determining step comprises the substep of determining whether a simplified determination method may be employed.

7. The method according to claim 6 wherein said determining whether a simplified determination method may be employed incorporates test conditions as part of the determination step.

8. The method according to claim 6 wherein said determining whether a simplified determination method may be employed incorporates measured data as part of the determination step.

9. The method of measuring far end crosstalk according to claim 6 wherein if said step of determining if simplification is available determines that simplification is unavailable, said determining equal level far end crosstalk step comprises calculating the equal level far end crosstalk in accordance with the following formula:

$$|ELFEXT_{a,b-c,d,link}| = \left| \begin{array}{c} \frac{|FEXT_{a,b-c,d,total}|}{|att_{c,d}|} e^{j(\varphi_{FEXT,a,b-c,d,total} - \varphi_{att,a,b})} - \\ |FEXT_{loc}| * e^{j(\varphi_{att,c,d} - \varphi_{att,a,b})} - |FEXT_{rem}| * \frac{|att_{a,b}|}{|att_{c,d}|} \end{array} \right|,$$

where a,b indicates a disturber signal path and c,d indicates a disturbed signal path.

10. The method of measuring far end crosstalk according to claim 6 wherein if said step of determining if simplification is available comprises determining if attenuation of the disturber and disturbed pairs is approximately equal, and if so, said determining equal level far end crosstalk step comprises calculating the equal level far end crosstalk in accordance with the following formula:

$$|ELFEXT_{a,b-c,d,link}| = \left| \begin{array}{c} \frac{|FEXT_{a,b-c,d,total}|}{|att_{c,d}|} e^{j(\varphi_{FEXT,a,b-c,d,total} - \varphi_{att,a,b})} - \\ |FEXT_{loc}| * e^{j(\varphi_{att,c,d} - \varphi_{att,a,b})} - |FEXT_{rem}| \end{array} \right|,$$

where a,b indicates a disturber signal path and c,d indicates a disturbed signal path.

11. The method of measuring far end crosstalk according to claim 6 wherein if said step of determining if simplification is available comprises determining if said link is relatively short, and if so, said determining equal level far end crosstalk step comprises calculating the equal level far end crosstalk in accordance with the following formula:

$$|ELFEXT_{a,b-c,d,link}| = \frac{|FEXT_{a,b-c,d,total}|}{|att_{c,d}|} - |FEXT_{loc}| - |FEXT_{rem}| * \frac{|att_{a,b}|}{|att_{c,d}|},$$

where a,b indicates a disturber signal path and c,d indicates a disturbed dignal path.

12. The method of measuring far end crosstalk according to claim 6 wherein if said step of determining if simplification is available comprises determining if delay skew of said link is below a maximum allowed value, and if so, said determining equal level far end crosstalk step comprises calculating the equal level far end crosstalk in accordance with the following formula:

$$|ELFEXT_{a,b-c,d,link}| = \frac{|FEXT_{a,b-c,d,total}|}{|att_{c,d}|} - |FEXT_{loc}| - |FEXT_{rem}| * \frac{|att_{a,b}|}{|att_{c,d}|},$$

where a,b indicates a disturber signal path and c,d indicates a disturbed signal path.

13. The method of measuring far end crosstalk according to claim 6 wherein if said step of determining if simplification is available comprises determining if attenuation of the disturber and disturbed pairs is approximately equal and if propagation delay in the disturber and disturbed pairs is approximately equal, and if so, said determining equal level far end crosstalk step comprises calculating the equal level far end crosstalk in accordance with the following formula:

$$|ELFEXT_{a,b-c,d,link}| = \frac{|FEXT_{a,b-c,d,total}|}{|att_{c,d}|} - |FEXT_{loc}| - |FEXT_{rem}|,$$

where a,b indicates a disturber signal path and c,d indicates a disturbed signal path.

14. The method of measuring far end crosstalk according to claim 1 wherein said disturber signal path and said disturbed signal path comprise twisted pair cabling.

15. A method of measuring far end crosstalk characteristics of a link with measurement results from a total system comprising the steps of:

measuring far end crosstalk of a local connector on the link;

measuring far end crosstalk of a remote connector on the link;

measuring crosstalk characteristics of the total system; and measuring the attenuation of signals on portions of the system subtracting the measured far end crosstalk of the local connector times a measured attenuation and subtracting the crosstalk of the remote connector times a measured attenuation from the measured crosstalk of the total system to provide the crosstalk characteristics of the link.

16. An apparatus for measuring far end crosstalk characteristics of a link comprising:

storage memory to store measured far end crosstalk characteristics of a local connector and of a remote connector;

phase and amplitude measurement apparatus to determine far end crosstalk at a remote end of the link;

attenuation measurement apparatus to measure attenuation in a disturbed pair;

propagation delay measurement apparatus to measure propagation delay of the disturbed pair and propagation delay of a disturbing pair; and determining apparatus for factoring out the crosstalk effects of the local and remote connectors to provide far end crosstalk and equal level far end crosstalk measurements of the link.

17. Apparatus according to claim 16 wherein said determining apparatus determines equal level far end cross talk in accordance with the following formula:

$$|ELFEXT_{a,b-c,d,link}| = \frac{|FEXT_{a,b-c,d,total}|}{|att_{c,d}|} - |FEXT_{loc}| - |FEXT_{rem}|,$$

where a,b indicates a disturber signal path and c,d indicates a disturbed signal path.

18. Apparatus according to claim 16 wherein said determining apparatus selectively employs simplified determinations depending on measured link characteristics.

19. Apparatus according to claim 18 wherein said determining apparatus employs simplified determinations in accordance with the following formula:

$$|ELFEXT_{a,b-c,d,link}| = \left| \begin{array}{c} \frac{|FEXT_{a,b-c,d,total}|}{|att_{c,d}|} e^{j(\varphi_{FEXT,a,b-c,d,total} - \varphi_{att,a,b})} - \\ |FEXT_{loc}| * e^{j(\varphi_{att,c,d} - \varphi_{att,a,b})} - |FEXT_{rem}| \end{array} \right|,$$

where a,b indicates a disturber signal path and c,d indicates a disturbed signal path, if attenuation of the disturber and disturbed pairs is approximately equal.

20. Apparatus according to claim 18 wherein said determining apparatus employs simplified determinations in accordance with the following formula:

$$|ELFEXT_{a,b-c,d,link}| = \frac{|FEXT_{a,b-c,d,total}|}{|att_{c,d}|} - |FEXT_{loc}| - |FEXT_{rem}| * \frac{|att_{a,b}|}{|att_{c,d}|},$$

where a,b indicates a disturber signal path and c,d indicates a disturbed signal path, if said link is relatively short.

21. Apparatus according to claim 18 wherein said determining apparatus employs simplified determinations in accordance with the following formula:

$$|ELFEXT_{a,b-c,d,link}| = \frac{|FEXT_{a,b-c,d,total}|}{|att_{c,d}|} - |FEXT_{loc}| - |FEXT_{rem}| * \frac{|att_{a,b}|}{|att_{c,d}|},$$

where a,b indicates a disturber signal path and c,d indicates a disturbed signal path, if delay skew of said link is below a maximum allowed value.

22. Apparatus according to claim 18 wherein said determining apparatus employs simplified determinations in accordance with the following formula:

$$|ELFEXT_{a,b-c,d,link}| = \frac{|FEXT_{a,b-c,d,total}|}{|att_{c,d}|} - |FEXT_{loc}| - |FEXT_{rem}|,$$

where a,b indicates a disturber signal path and c,d indicates a disturbed signal path, if attenuation of the disturber and disturbed pairs is approximately equal and if propagation delay in the disturber and disturbed pairs is approximately equal.

23. Apparatus according to claim 18 wherein said determining apparatus employs simplified determinations if the error from this simplification is a fraction of the overall measurement accuracy.

* * * * *